United States Patent
Valensa (10) Patent No.: US 7,192,460 B2
(45) Date of Patent: Mar. 20, 2007

(54) REFORMATE COOLING SYSTEM AND METHOD FOR USE IN A FUEL PROCESSING SUBSYSTEM

(75) Inventor: Jeroen Valensa, New Berlin, WI (US)

(73) Assignee: Modine Manufacturing Company, Racine, WI (US)

( * ) Notice: Subject to any disclaimer, the term of this patent is extended or adjusted under 35 U.S.C. 154(b) by 532 days.

(21) Appl. No.: 10/376,367

(22) Filed: Feb. 28, 2003

(65) Prior Publication Data

US 2004/0170874 A1 Sep. 2, 2004

(51) Int. Cl.
*B01J 3/00* (2006.01)

(52) U.S. Cl. .............. 48/198.3; 48/61; 48/127.9; 48/197 R; 422/190; 422/191; 422/192; 422/193; 422/194; 422/195; 422/196; 429/12; 429/13; 429/15; 429/26

(58) Field of Classification Search ............ 48/61, 48/127.9, 197 R; 422/190–198; 429/12–26
See application file for complete search history.

(56) References Cited

FOREIGN PATENT DOCUMENTS

JP 2000315508 * 11/2000

WO WO0148851 A1 * 7/2001

* cited by examiner

*Primary Examiner*—Glenn Caldarola
*Assistant Examiner*—Vinit H. Patel
(74) *Attorney, Agent, or Firm*—Michael Best & Friedrich LLP (57) ABSTRACT

A cooling system (10) is provided for use with a fuel processing subsystem (12) for reducing a level of carbon monoxide in a reformate flow (14) for a proton exchange membrane fuel cell system (16). The fuel processing subsystem (12) includes first and second preferential oxidizers (18, 20) to oxidize the carbon monoxide carried in the reformate flow. The reformate cooling system (10) includes a coolant flow path (30), a reformate flow path (32), and first, second, third, and fourth heat exchanger core portions (34, 36, 38, 40). The core portions (36–40) are arranged in numbered sequence along the reformate flow path (32) with the first and second core portions (34, 36) located upstream of the first preferential oxidizer (18), and the third and fourth core portions (38, 40) located downstream of the first preferential oxidizer (18) and upstream of the second preferential oxidizer (20). The first and second core portions (34, 36) are arranged in numbered sequence along the coolant flow path (30), one of the third and fourth core portions (38, 40) is arranged upstream of the first core portion (34) along the coolant flow path (30), and the other of the third and fourth core portions (38, 40) is arranged downstream of the second core portion along the coolant flow path (30).

17 Claims, 6 Drawing Sheets

TURNDOWN OF COOLANT VS. TURNDOWN OF REFORMATE

REFORMATE COOLING SYSTEM AND METHOD FOR USE IN A FUEL PROCESSING SUBSYSTEM

FIELD OF THE INVENTION

This invention relates to fuel processing subsystems for fuel cell systems, and in more particular applications, to cooling systems for the reformate fluid flow in fuel processing subsystems for polymer electrolyte membrane fuel cell systems commonly referred to as proton exchange membrane (PEM) fuel cell systems.

BACKGROUND OF THE INVENTION

In typical PEM fuel-cell systems, a fuel such as methane or a similar hydrocarbon, is used as a source of the hydrogen for the anode side of the fuel cell. In many systems, particularly those of the stationary power generation type, humidified natural gas and air are chemically converted to a hydrogen-rich gas stream known as reformate by a fuel processing subsystem of the fuel cell system. During this reforming process, the level of carbon monoxide (CO) must be reduced to a low level (typically less than 10 ppm) since the PEM fuel cell membrane is easily poisoned by CO.

The reforming reaction is typically an oxygenolysis reaction with an associated water-gas shift $[CH_4+H_2O \rightarrow CO+3H_2, CO+H_2O \rightarrow CO_{2+}+H_2]$ and/or partial oxidation reaction $[CH_4+0.5O_2 \rightarrow CO+2H_2]$. While the water-gas shift reaction associated with steam reforming removes some of the CO from the reformate flow stream, the overall product reformate gas will always contain some level of CO, the amount being dependent upon the temperature at which the reforming process occurs. In this regard, the CO concentration of the reformate flow is normally well-above the acceptable level for the PEM fuel cell membrane. To reduce the CO content within acceptable levels, several catalytic reactions will typically be used in the fuel processing subsystem to cleanup, i.e. reduce, the CO in the reformate flow. These catalytic reactions require that the reformate flow temperature be within relative precise temperature ranges. Typical reactions for reducing CO include the aforementioned water-gas shift, as well as selective oxidation of the CO over a precious metal catalyst in a selective or preferential oxidizer (PrOx), typically with a small amount of air added to the reformate flow to provide oxygen for the catalytic reaction. Often, several stages of CO cleanup are required before the CO content is sufficiently reduced, with each stage typically requiring that the reformate temperature be reduced to a precise temperature range so that the desired catalytic reaction will occur. In this regard, liquid-cooled heat exchangers are frequently employed to control the reformate temperature at each stage.

However, the use of liquid-cooled heat exchangers for the above purpose presents a challenge in successfully maintaining the required temperatures during turndown (reduced power) operation of the fuel cell system wherein the flow rate of the reformate flow is reduced from that required for full power operating conditions. Specifically, because the heat exchangers need to be designed for the appropriate heat transfer effectiveness at full flow rate, the heat exchangers will typically be too effective when the flow rate of the reformate flow is reduced. This can be mitigated by adjustment of the coolant flow rate (via control of the coolant pump or by-pass valving) and/or the coolant temperature (via recirculation of a portion of the coolant flow). However, this is complicated by the distribution of the CO cleanup into several different reactions, each of which requires a heat exchanger to control the temperature of the reformate flow. Because the heat exchangers will typically not all have the same response to the above described adjustments at turndown, the coolant flow and/or temperature to each heat exchanger may have to be separately controlled, resulting in a relatively complicated coolant control scheme with duplicate by-pass valves, recirculation pumps, etc.

SUMMARY OF THE INVENTION

In accordance with one form of the invention, a reformate cooling system is provided for use with a fuel processing subsystem for reducing a level of carbon monoxide in a reformate flow for a proton exchange membrane fuel cell system. The fuel processing subsystem includes first and second preferential oxidizers to oxidize the carbon monoxide carried in the reformate flow. The second preferential oxidizer is located downstream from the first preferential oxidizer with respect to the reformate flow and requires a lower catalytic reaction temperature range for the reformate flow than the first preferential oxidizer. The reformate cooling system includes first and second heat exchanger units to transfer heat from the reformate flow to a coolant flow. The first heat exchanger unit includes first and second core portions through which the reformate flow and a coolant flow pass in heat exchange relation to each other. The first heat exchanger unit is located upstream from the first preferential oxidizer with respect to the reformate flow. The second heat exchanger unit includes third and fourth core portions through which the reformate flow and the coolant flow pass in heat exchange relation. The second heat exchanger unit is located upstream from the second preferential oxidizer and downstream from the first preferential oxidizer with respect to the reformate flow.

In one form, The first core portion is located upstream from the second core portion with respect to the coolant flow and the reformate flow. The third core portion is located upstream from the fourth core portion with respect to the reformate flow. One of the third and fourth core portions is located upstream from the first core portion with respect to the coolant flow. The other of the third and fourth core portions is located downstream from the second core portion with respect to the coolant flow. The coolant flows in series through the one of the third and fourth core portions, the first core portion, the second core portion, and then the other of the third and fourth core portion. The reformate flows in series through the first core portion, the second core portion, the first preferential oxidizer, the third core portion, the fourth core portion, and then the second preferential oxidizer.

According to one form, the first core portion is connected to the second core portion to supply both the coolant flow and the reformate flow to the second core portion. The third core portion is connected to the fourth core portion to supply the reformate flow to the fourth core portion. One of the third and fourth core portions is connected to the first core portion to supply the coolant flow to the first core portion. The other of the third and fourth core portions is connected to the second core portion to receive the coolant flow from the second core portion.

In one form, the reformate cooling system includes a coolant flow path, a reformate flow path, and first, second, third, and fourth heat exchanger core portions, with each of the core portions including part of the coolant flow path and part of the reformate flow path in heat exchange relation to transfer heat from the reformate flow to a coolant flow. The core portions are arranged in numbered sequence along the reformate flow path with the first and second core portions located upstream of the first preferential oxidizer, and the third and fourth core portions located downstream of the first preferential oxidizer and upstream of the second preferential oxidizer. The first and second core portions are arranged in numbered sequence along the coolant flow path, one of the third and fourth core portions is arranged upstream of the first core portion along the coolant flow path. The other of the third and fourth core portions is arranged downstream of the second core portion along the coolant flow path.

In one form, the one of the third and fourth core portions is the third core portion, and the other of the third and fourth core portions is the fourth core portion.

In accordance with one form of the invention, a method is provided for cooling a reformate flow to desired temperature ranges for first and second catalytic reactions in a fuel processing subsystem for a proton exchange membrane fuel cell system wherein the reformate undergoes the first catalytic reaction before the second catalytic reaction.

In one form, the method includes the steps of:
a) between the first and second catalytic reactions, transferring heat from the reformate flow to an initial pass of a coolant flow;
b) before the first catalytic reaction, transferring heat from the reformate flow to the coolant flow heated in step a);
c) before the first catalytic reaction, transferring heat from the reformate flow cooled in step b) to the coolant heated in step b) and
d) between the first and second catalytic reactions, transferring heat from the reformate flow cooled at step c) to the coolant heated in step c).

In one form, the method includes the step of cooling the reformate flow to the desired temperature range for the second catalytic reaction with an initial pass of a coolant flow that has not been heated by the reformate flow and with another pass of the coolant flow that has been heated upstream of the first catalytic reaction by the reformate flow.

According to one form, the method includes the step of cooling the reformate flow to the desired temperature range for the first catalytic reaction with a coolant flow that has been heated both by the reformate flow downstream of the first catalytic reaction and the reformate flow upstream of the first catalytic reaction.

In one form, a total flow rate of the coolant flow is regulated to cool the reformate flow to desired temperature ranges for the first and second catalytic reaction. In a further form, the total flow rate of the coolant is regulated as a function of the flow rate of the reformate. In a further form, the function is a linear function.

Other objects, advantages, and features will become apparent from a complete review of the entire specification, including the appended claims and drawings.

DETAILED DESCRIPTION OF THE PREFERRED EMBODIMENTS

Figure 1:
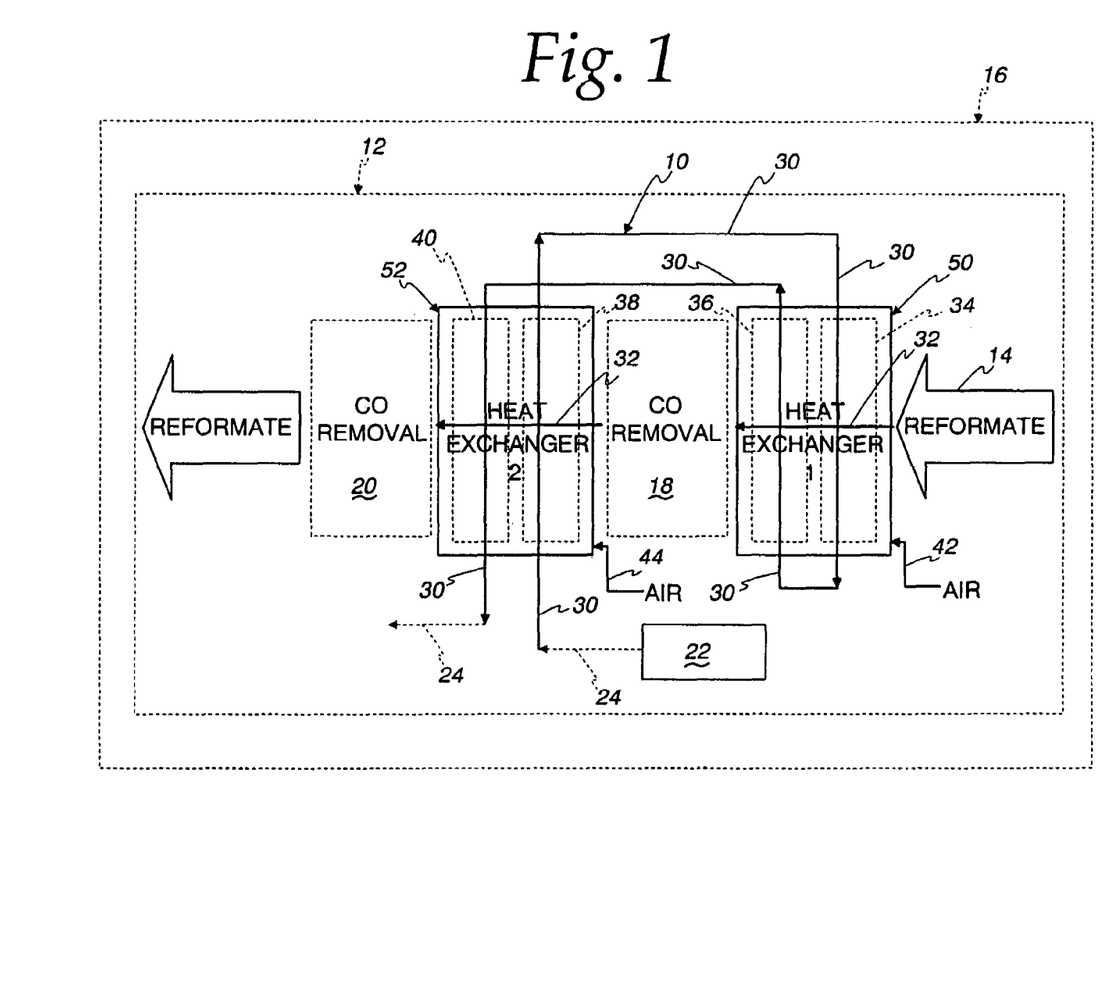
FIG. 1 is a diagrammatic representation of a reformate cooling system and method embodying the present invention.

As seen in FIG. 1 a reformate cooling method and system 10 are provided for use in a fuel processing subsystem, shown schematically at 12, for reducing a level of carbon monoxide (CO) in a reformate flow 14 supplied by the fuel processing subsystem 12 for a proton exchange membrane fuel cell system, shown schematically at 16. The reformate cooling method and system 10 provide an advantageous coolant flow scheme that can allow for simplification of the fuel cell system 16 in comparison to conventional reformate cooling systems.

The fuel processing subsystem 12 includes a pair of preferential oxidizers 18 and 20 that oxidize the CO carried in the reformate flow 14. Each of the preferential oxidizers 18 and 20 includes a suitable catalyst that requires the reformate flow 14 to be within a desired catalytic reaction temperature range for an optimum catalytic reaction in the preferential oxidizer 18, 20. The preferential oxidizer 20 is located downstream from the preferential oxidizer 18 with respect to the reformate flow 14 and will typically require a lower catalytic reaction temperature range for the reformate flow 14 than the catalytic reaction temperature range required for the preferential oxidizer 18. In addition, a suitable coolant supply subsystem 22 of the fuel cell system 16 supplies a coolant flow 24 to the cooling system 10, preferably with an adjustable total flow rate for the coolant flow 24 and a coolant temperature that is held relatively constant during turndown operation of the fuel cell system 16. Because there are many known forms for proton exchange membrane fuel cell systems 16, fuel processing subsystems 12 therefor, preferential oxidizers 18, 20 therefor, and coolant supply subsystems 22 therefor, and because the reformate cooling method and system 10 can be incorporated with a multi-stage CO cleanup process of any fuel processing subsystems for any proton exchange membrane fuel cell system; further details of the fuel processing subsystem 12, the proton exchange membrane fuel cell system 16, the preferential oxidizers 18, 20, and the coolant supply subsystem 22 are not critical to the invention and will not be described further herein.

The reformate cooling system 10 includes a coolant flow path, shown schematically by the arrowed lines 30, a reformate flow path, shown schematically by the arrowed lines 32, and first, second, third, and fourth heat exchanger core portions 34, 36, 38, and 40, with each of the core portions 34, 36, 38, and 40 including part of the coolant flow path 30 and part of the reformate flow path 32 in heat exchange relation to transfer heat from the reformate flow 14 flowing through the reformate flow path 32 to the coolant flow 24 flowing through the coolant flow path 30. The core portions 34, 36, 38, and 40 are arranged in numbered sequence along the reformate flow path 32, with the first and second core portions 34 and 36 located upstream of the first preferential oxidizer 18, and the third and fourth core portions 38 and 40 located downstream of the first preferential oxidizer 18 and upstream of the second preferential oxidizer 20. The first and second core portions 34 and 36 are arranged in numbered sequence along the coolant flow path 30, the third core portion 38 is arranged upstream of the first core portion 34 along the coolant flow path 30, and the fourth core portion 40 is arranged downstream of the second core portion 36 along the coolant flow path so that the coolant flow 24 flows in series through the third core portion 38, the first core portion 34, the second core portion 36, and then the fourth core portion 40. The coolant flow 24 is supplied to the cooling system 10 by the coolant supply system 22 of the fuel cell system 16. In this regard, it is preferred that the coolant be in the form of a suitable liquid coolant. However, in some fuel cell systems 16, it may be advantageous for the coolant to be provided in the form of a gas coolant or two phase fluid coolant. Preferably, the coolant flow 24 is provided to the cooling system 10 within a desired temperature range that does not vary with turndown of the fuel cell system 16.

In some fuel processing subsystems 12, it may be desirable to inject a small amount of air upstream of first core portion 34 and the third core portion 38 as shown at 42 and 44, respectively, so as to provide oxygen for the catalytic reaction in each of the preferential oxidizers 18 and 20. Air injection systems are well known for fuel processing subsystems 12 and the particular form of air injection will be highly dependent upon the details of the particular fuel processing subsystem 12. Further, it should be understood that such air injection is not a part or function of the cooling system 10 and, accordingly, need not be further described herein.

Each of the core portions 34, 36, 38 and 40 can be of any suitable construction, many of which are known, such as for example, plate-fin type constructions, bar-plate type constructions, drawn cup type constructions, tube and fin type constructions, etc. Preferably, the respective parts of each of the flow paths 30 and 32 in each of the core portions 34, 36, 38, and 40 provides a single pass of the coolant flow 24 with respect to a single pass of the reformate flow 14 through the core portion 34, 36, 38, and 40, with multiple, parallel flow passages defining the part of the coolant flow path 34 and multiple parallel flow passages defining the part of the reformate flow path 32 in each core portion 34, 36, 38, and 40. Preferably, the first and second core portions 34 are constructed as a first heat exchanger unit 50 located upstream of the preferential oxidizer 18 with respect to the reformate flow 14, and the third and fourth core portions 38 and 40 are constructed as a second heat exchanger unit 52 located downstream from the preferential oxidizer 18 and upstream from the preferential oxidizer 20 with respect to the reformate flow 14. Furthermore, the portions of the respective flow paths 30 and 32 that connect the cores 34, 36, 38, and 40 to each other can be defined by any suitable fluid conduit, such as for example, hoses, metal tubing, and/or flow passages that are integrated into other structures of any of the systems 10, 12, 16. It should be appreciated that, in this respect, the particular type of fluid conduit selected will be highly dependent upon the requirements of each application and the construction selected for each of the core portions 34–40, and accordingly, the details of the fluid conduits are not critical to the coolant flow scheme of the invention.

In operation, the reformate flow 14 is cooled to the desired catalytic reaction temperature range for the first catalytic reaction in the first preferential oxidizer 18 by the coolant flow 24 passing through the first and second core portions 34 and 36. In this regard, it should be appreciated that the coolant flow 24 supplied to the first and second core portions 34 and 36 has been heated by the transfer of heat from the reformate flow 14 to the coolant flow 24 passing through the third core portion 38 downstream of the first catalytic reaction in the preferential oxidizer 18. It should also be appreciated that the coolant flow 24 passing through the second core portion 36 has been further heated by the reformate flow upstream of the first catalytic reaction in the preferential oxidizer 18 by the transfer of heat from the reformate flow 14 to the coolant flow 24 in the first core portion 34. After passing through the first and second core portions 34 and 36 and being cooled to the desired catalytic reaction temperature thereby, the reformate flow 14 is directed to the first preferential oxidizer 18 and undergoes the first catalytic reaction to oxidize the CO, thereby removing CO from the reformate flow 14. Typically, the catalytic reaction will result in a temperature increase for the reformate flow 14 so that the reformate flow 14 has a higher temperature exiting the preferential oxidizer 18 than entering. After passing through the first preferential oxidizer 18, the reformate flow 14 passes through the third and fourth core portions 38 and 40 wherein the reformate flow 14 transfers heat to the coolant flow 24 and is cooled to the desired catalytic reaction temperature range for the catalytic reaction in the second preferential oxidizer 20. In this regard, it should be noted that the reformate flow 14 is first cooled by an initial pass of the coolant flow 24 passing through the core portion 38 that has not been previously heated by the reformate flow 14 and, accordingly, is at the lowest temperature for the coolant flow 24 in the flow pass 30. It should also be appreciated that the reformate flow 14 passing through the core portion 40 is cooled by the coolant flow 24 that has been previously heated in the first and second core portions 34 and 36 by the reformate flow 14 upstream of the first catalytic reaction, and by the reformate flow 14 passing through the third core portion 38. Furthermore, because the coolant flow 24 has been heated in the other three core portions 34, 36, 38 and the reformate flow 14 has been cooled in the other three core portions 34, 36, 38, this structure and flow scheme allows, in some applications, for the fourth core portion 40 to actually heat the reformate flow 14 passing through the core portion 40 under certain turndown conditions, rather than cool the reformate flow 14, to maintain the reformate flow 14 within the desired catalytic temperature range. If this occurs, it should be noted that the temperature of the reformate flow 14 exiting the fourth core portion 40 will still be lower than the temperature of the reformate flow 14 entering the third core portion 38 because of the cooling provided by the initial pass of the coolant flow 24 through the third core portion 38. After being cooled to the desired catalytic temperature range, the reformate flow 14 is directed from the fourth core portion 40 into the preferential oxidizer 20 wherein the reformate flow 14 undergoes the second catalytic reaction to oxidize the CO, thereby removing CO from the reformate flow 14.

Since the coolant flow 24 is not divided between the two heat exchanger units 50 and 52, or between the core portions 34, 36, 38, and 40, the fuel cell system 16 need only control the total flow rate of the coolant flow 24 supplied by the coolant system 22 of the fuel cell system 16. In this regard, it should be appreciated that there are a number of suitable and known methods for controlling the total flow rate of the coolant flow 24, such as for example, a flow rate control valve, a by-passing valve, a variable flow rate coolant pump, etc.

Figure 2:
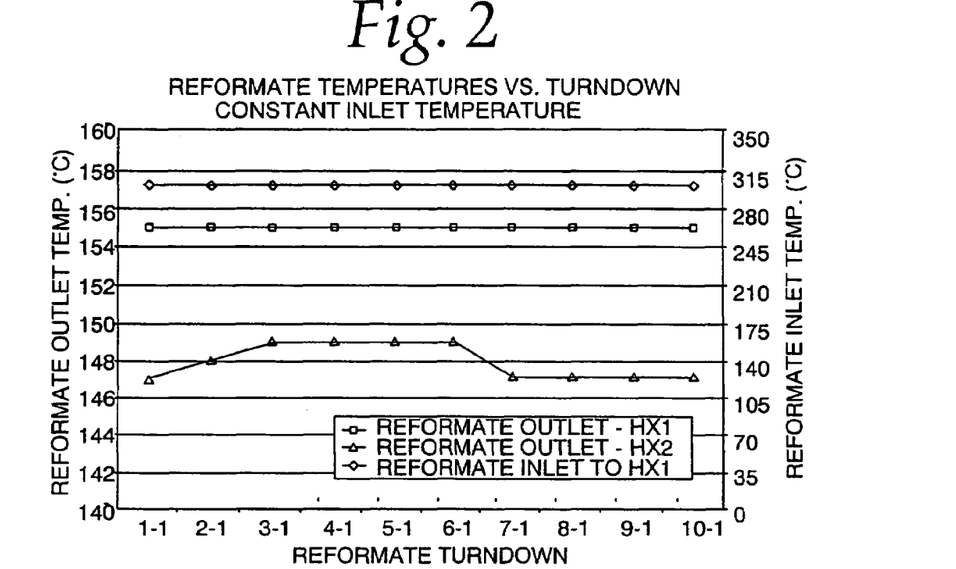
FIG. 2 is a graph showing the temperature of a reformate flow versus the reformate turndown for an exemplary cooling system made according to FIG. 1 wherein an inlet temperature of the reformate flow entering the system is maintained constant over the range of reformate turndown.
Figure 3:
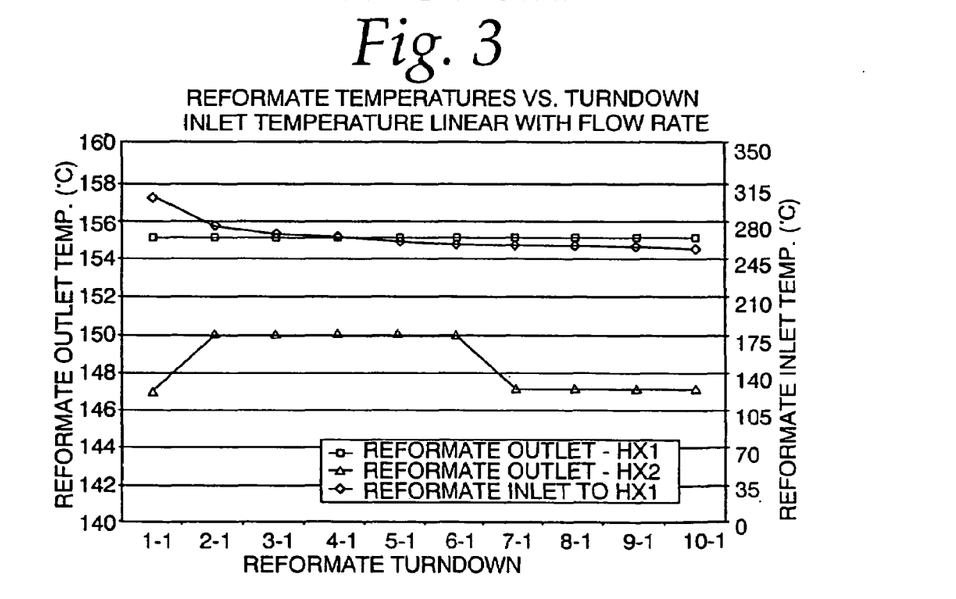
FIG. 3 is a graph similar to FIG. 2, but showing the temperature of a reformate flow wherein an inlet temperature of the reformate flow is a linear function of the flow rate of the reformate flow entering the system.

In one example analyzed by the inventor, it was assumed that, all the heat exchanger core portions 34, 36, 38, and 40 have identical construction and sizing; the optimum catalytic reaction temperature in the first preferential oxidizer 18 for the reformate flow 14 was 155° C.; the optimum catalytic reaction temperature for the second catalytic reaction in the second preferential oxidizer 20 for the reformate flow was 147° C.; the temperature of the reformate flow 14 entering the first core portion 34 was maintained by the fuel processing subsystem 12 at 300° C. for all turndown ratios; the temperature of the coolant flow 24 entering the core portion 40 was maintained at 100° C. by the coolant supply system 22 for all turndown ratios; and the total flow rate of the coolant flow 24 entering the coolant system 10 (i.e. entering the third core portion 38) was regulated by the coolant supply system 22 to maintain the temperature of the reformate flow 14 exiting the second core portion 36 at 155° C. for all turndown ratios, which is the assumed optimum catalytic reaction temperature for the first catalytic reaction in the preferential oxidizer 18 for the reformate flow 14. Utilizing these assumption, FIG. 2 illustrates the calculated temperature of the reformate flow 14 entering the first core portion 34, exiting the second core portion 36 and entering the first preferential oxidizer 18, and exiting the fourth core portion 40 and entering the second preferential oxidizer 20. It can be seen that while the temperature of the reformate flow 14 exiting the fourth core portion 40 does not remain perfectly constant over the range of reformate turndown, the temperature does not vary substantially from the optimum catalytic reaction temperature of 147° C. for the second catalytic reactions and it is within an acceptable range for a suitable catalytic reaction. FIG. 3 utilizes the same assumptions as FIG. 2, with the exception that the temperature of the reformate flow 14 entering the first core portion 34 is a linear function of the flow rate of the reformate flow 14 entering the first core portion 34 that varies downward from a temperature of 301° C. at a 1-1 reformate turndown. Again, it can be seen that while the temperature of the reformate flow exiting the fourth core portion 40 does not remain perfectly constant over the range of reformate turndown, the temperature does not vary substantively from the optimum catalytic reaction temperature of 147° C. for the second catalytic reaction and is within an acceptable range for a suitable catalytic reaction.

Figure 4:
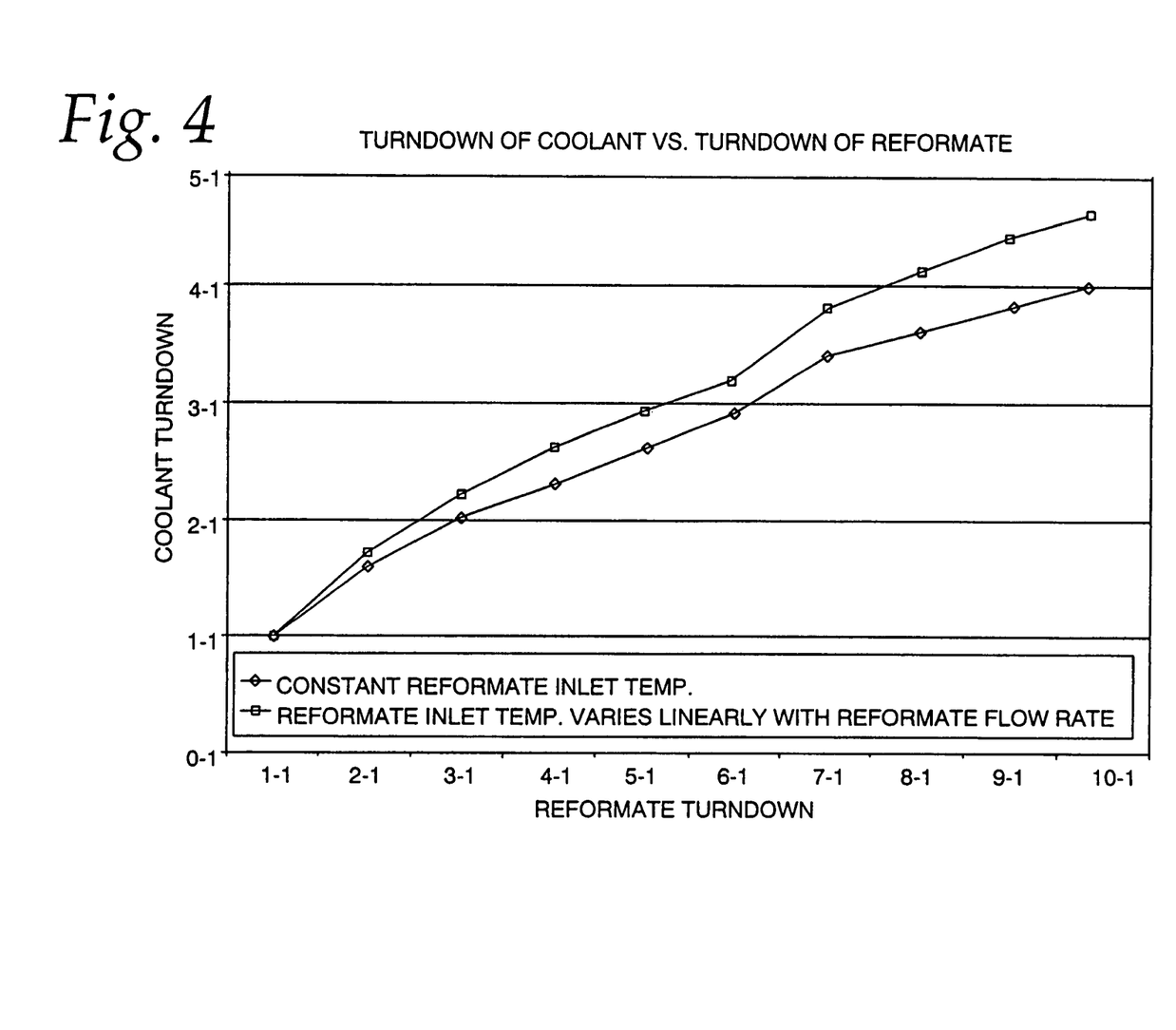
FIG. 4 is a graph comparing the coolant flow turndown to the reformate, flow turndown for the exemplary cooling system of FIGS. 2 and 3.

FIG. 4 illustrates the reformate flow turndown relative to the coolant flow turndown required to maintain the temperature of the reformate flow 14 exiting the second core portion 36 at the desired optimum catalytic reaction temperature of 155° C. for the first catalytic reaction in the first preferential oxidizer 18 and to obtain the temperatures of FIGS. 2 and 3 under the same assumption as FIGS. 2 and 3. It can be seen from FIG. 4 that the turndown ratio of the total flow rate of the coolant flow closely follows a linear relationship for both the constant reformate inlet temperature of FIG. 2 and the linear function reformate inlet temperature of FIG. 3, thereby showing that it is possible, at least in some applications, to control the total flow rate of the coolant flow as a linear function of the flow rate of the reformate flow 14 or as a linear function of the reformate turndown, without requiring feedback of the temperature of the reformate flow 14 as it flows along the reformate flow path. However, it should be appreciated, that in some applications, it may be desirable to control the total flow rate of the coolant flow 24 based on a feedback of the temperature of the reformate flow 14 as it flows through the reformate flow path 32, such as for example, a feedback of the temperature of the reformate flow 14 exiting the second core portion 36.

Figure 5:
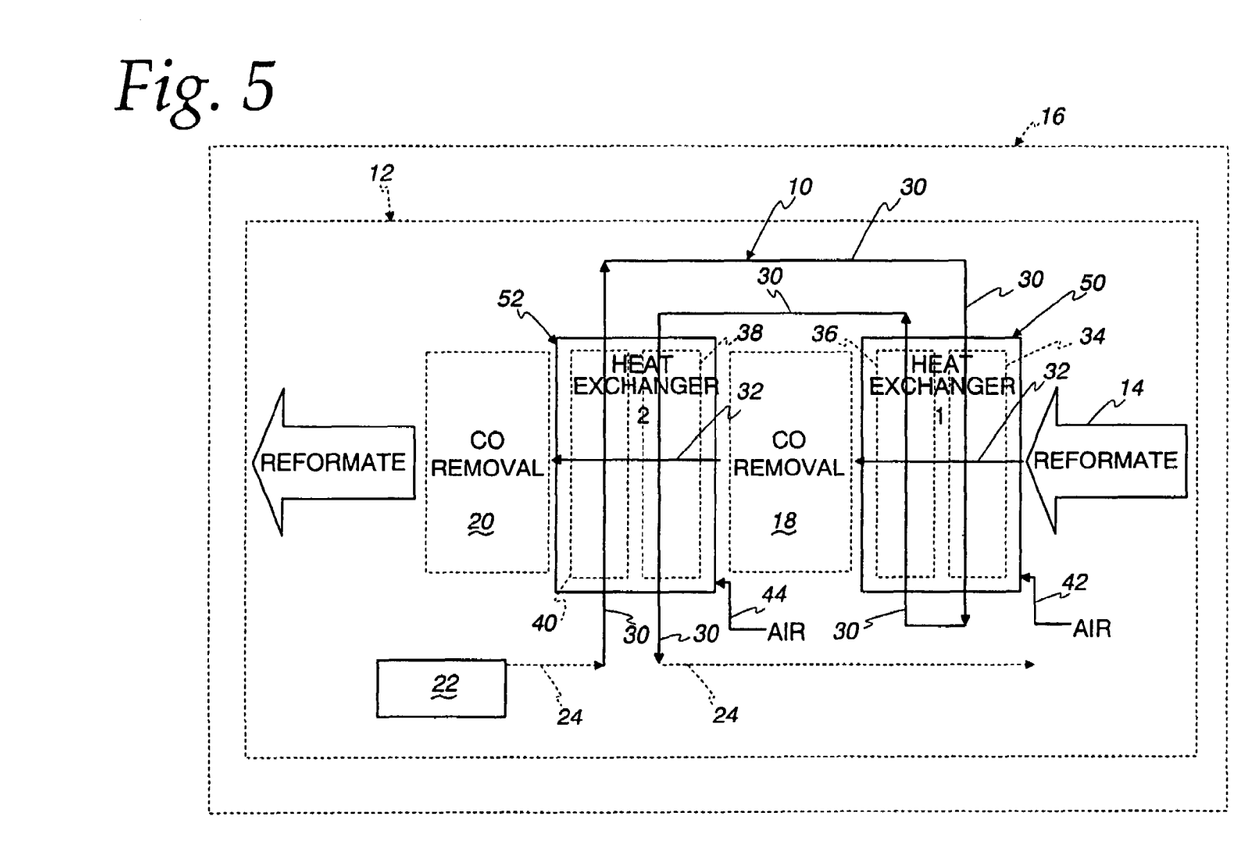
FIG. 5 is a diagrammatic representation of another embodiment of a reformate cooling system and method embodying the present invention.

FIG. 5 illustrates a variation in the reformate cooling system of FIG. 1 wherein the initial pass of the coolant flow 24 in the coolant flow path 30 is through the fourth core portion 40, rather than the third core portion 38, and the final pass of the coolant flow 24 in the coolant flow path 30 is through the third core portion 38, rather than the fourth core portion 40. Thus, in the embodiment of FIG. 5, the first, second, and third portions 34, 36, and 38 are arranged in numbered sequence along the coolant flow path 30, and the fourth core portion 38 is arranged upstream of the first core portion 34 along the coolant flow path 30 so that the coolant flow 24 flows in series through the fourth core portion 40, the first core portion 34, the second core portion 36, and then the third core portion 38. In all other respects, the embodiment of FIG. 5 is identical to that of FIG. 1.

Figure 6:
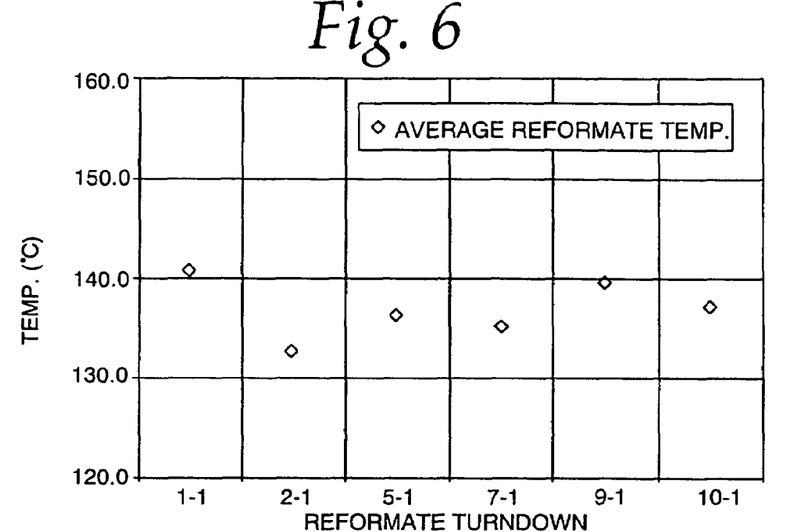
FIG. 6 is a graph showing the temperature of a reformate flow exiting a downstream heat exchanger of FIG. 5 for an exemplary cooling system made according to FIG. 5.
Figure 7:
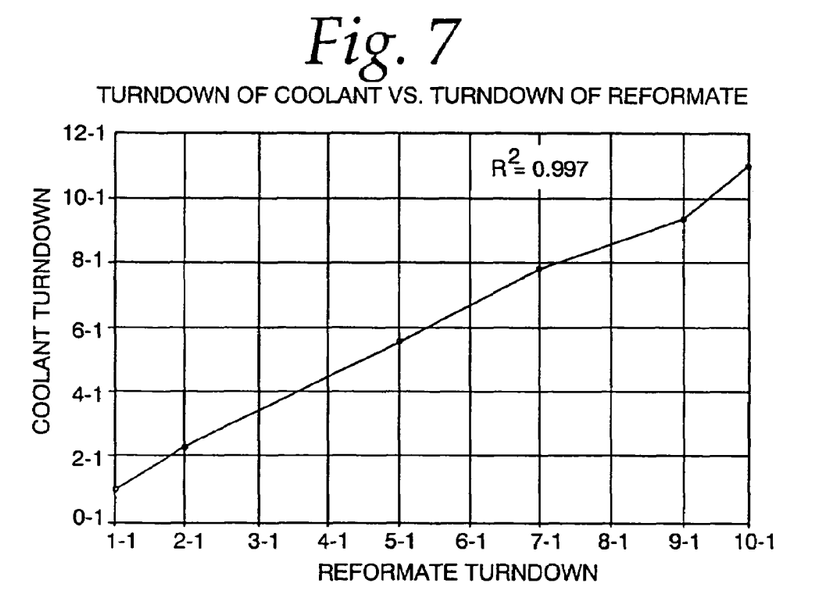
FIG. 7 is a graph comparing the coolant flow turndown to the reformate flow turndown for the exemplary cooling system of FIG. 6.

In one example analyzed by the inventor for the embodiment of FIG. 5, it was assumed that: all the heat exchangers core portions 34, 36, 38, and 40 have identical construction and sizing; the optimum catalytic reaction temperature in the first preferential oxidizer 18 for the reformate flow 14 was 167° C.; the optimum catalytic reaction temperature for the second catalytic reaction in the second preferential oxidizer 20 for the reformate flow 14 was 140° C.; the temperature of the reformate flow 14 entering the first core portion 34 was maintained by the fuel processing subsystem 12 at 300° C. for all turndown ratios; the temperature of the coolant flow 24 entering the core portion 40 was maintained at 100° C. by the coolant supply system 22 for all turndown ratios; and the total flow rate of the coolant flow 24 entering the coolant system 10 (i.e. entering the fourth core portion 40) was regulated by the coolant supply system 22 to maintain the temperature of the reformate flow 14 exiting the second core portion 36 at 167° C. for all turndown ratios, which is the assumed optimum catalytic reaction temperature for the first catalytic reaction in the preferential oxidizer 18 for the reformate flow 14. Utilizing these assumptions, FIG. 6 illustrates the calculated temperature of the reformate flow 14 exiting the fourth core portion 40 and entering the second preferential oxidizer 20 over a range of reformate turndown. It can be seen that while the temperature of the reformate flow 14 exiting the fourth core portion 40 does not remain perfectly constant over the range of reformate turndown, the temperature does not vary substantially from the optimum catalytic reaction temperature of 140° C. for the second catalytic reaction and is within an acceptable range for a suitable catalytic reaction. Utilizing the same assumptions, the solid line in FIG. 7 illustrates the reformate flow turndown relative to coolant flow turndown required to maintain the temperature of the reformate flow 14 exiting the second core portion 36 at the desired optimum catalytic reaction temperature of 167° C. for the first catalytic reaction in the first preferential oxidizer 18 and to obtain the calculated temperatures of FIG. 2. It can be seen from the graph that the turndown ratio of the total flow rate of the coolant flow 24 closely follows a linear relationship (shown by a linear dash line), showing that it is possible, at least in some applications, to control the total flow rate of the coolant flow 24 as a linear function of the flow rate of the reformate flow 14 or as a linear function of the reformate turndown, without requiring feedback of the temperature of the reformate flow 14 as it flows along the reformate flow path 32. However, it should be appreciated, that in some applications, it may be desirable to control the total flow rate of the coolant flow 24 based on a feedback of the temperature of the reformate flow 14 as it flows through the reformate flow path 32, such as for example, a feedback of the temperature of the reformate flow 14 exiting the second core portion 36.

According to analysis preformed by the inventor, the embodiment of FIG. 1 appears to be more stable over a broader range of reformate inlet temperature conditions and desired catalytic reaction temperatures than the embodiment of FIG. 5. For example, the embodiment of FIG. 1 appears to be more stable when the reformate inlet temperature into the first core portion 34 varies as a linear function of the reformate flow rate entering the first core portion 34. However, it should be appreciated that both embodiments provide advantages over conventional cooling systems, and that in some applications, the embodiment of FIG. 5 may be more desirable than the embodiment of FIG. 1.

Figure 8:
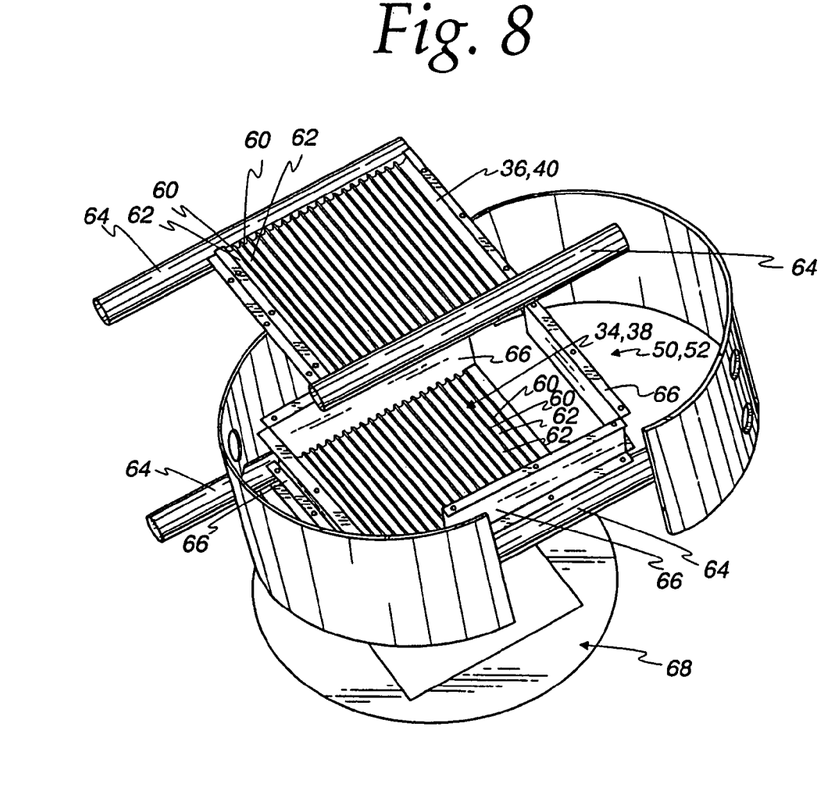
FIG. 8 is a partially exploded perspective view of one possible construction of a heat exchanger unit for use in the cooling system shown in FIG. 5.

Preferably, for both of the embodiments of FIGS. 1 and 5, each of the core portions 34, 36, 38, and 40 are identical with respect to sizing and basic construction. However, in some applications, it may be desirable for the core portions 34 and 36 to have a different basic construction and/or sizing than the core portions 38 and 40, or for all of the core portions 34, 36, 38, and 40 to have different basic constructions and/or sizing. For purposes of illustration only, one possible construction for the core portion 34, 36, 38 and 40, and the heat exchanger units 50 and 52 is shown in FIG. 8, which shows a construction for a pair 34, 36 or 38, 40 of the core portions 34, 36, 38, and 40 and for one of the heat exchanger units 50 or 52. As seen in FIG. 8, in this embodiment, each of the core portions 34–40 is defined by a plurality of spaced, parallel flattened tubes 60 and by serpentine fins 62 that extend between each of the tubes 60. The ends of the tubes 60 are received in a pair of oppositely spaced, parallel cylindrical manifolds 64, with one of the manifolds 64 distributing the coolant flow 24 to the interior of the tubes 60 and the other of the manifolds 64 collecting the coolant flow 24 from the interiors of the coolant tubes 60. Suitable structural frame members 66 are used to connect the pair of core portions 34,36 or 38, 40 together to form the heat exchanger unit 50 or 52, respectively. A suitable baffle plate 68 is provided at the reformate inlet side of the heat exchanger unit 50 to direct the reformate flow 14 over the exterior of the tubes 60 and through the serpentine fins 62 of each of the core portions 34, 36 or 38, 40 so as to transfer heat from the reformate flow 14 to the coolant flow 24 flowing through the interior of the tubes 60. In this regard, It should also be appreciated that the frame members 66 form a duct that directs the reformate flow 14 between the pair of core portions 34, 36 or 38, 40.

Having described one possible construction, it should be understood that the type and details of the construction of each of the core portions 34, 36, 38, and 40, as well as the flow conduits that define the coolant flow path 30 between each of the core portions 34, 36, 38, and 40 will be highly dependent upon the particular requirements of each of application, such as for example, the desired temperature ranges for each of the catalytic reactions, the construction and arrangement of the preferential oxidizers 18 and 20, the type of coolant supplied by the fuel cell system 16, the temperature of the coolant provided by the fuel cell system 16, the available flow rate for the coolant flow 24 supplied by fuel cell system 16, the temperature of the reformate flow 14 entering the first core portion 34, the maximum flow rate of the reformate flow 14 entering the first core portion 34, the maximum turndown for the reformate flow 14, and the available envelope for the cooling system 10. Accordingly, the invention is not in any way limited to the example shown in FIG. 4, unless such structure is expressly recited in a claim.

It should be appreciated that, for each of the embodiments of FIGS. 1 and 5, the unique coolant flow routing scheme of the cooling method and system 10 allows for a simplified reformate cooling system that does not require forward or backward bypassing of a coolant flow within the cooling system 10 and, furthermore, can allow for a simplified control scheme within the fuel cell system 16 that can eliminate the need for multiple coolant flow pumps and/or coolant flow control valves or bypass valves in comparison to conventional cooling systems.

What is claimed is:

1. A method of cooling a reformate flow to desired temperature ranges for first and second catalytic reactions in a fuel processing subsystem for a proton exchange membrane fuel cell system wherein the reformate undergoes the first catalytic reaction before the second catalytic reaction, the method comprising the steps of:
    a) between the first and second catalytic reactions, transferring heat from the reformate flow to an initial pass of a coolant flow;
    b) before the first catalytic reaction, transferring heat from the reformate flow to the coolant flow heated in step a);
    c) before the first catalytic reaction, transferring heat from the reformate flow cooled in step b) to the coolant flow heated in step b);
    d) between the first and second catalytic reaction, transferring heat from the reformate flow cooled in step c) to the coolant flow heated in step c).

2. The method of claim 1 further comprising the step of regulating a total flow rate of the coolant flow.

3. The method of claim 1 further comprising the step of regulating a flow rate of the coolant flow as a function of the flow rate of the reformate.

4. The method of claim 3 wherein the function is a linear function.

5. A method of cooling a reformate flow to desired temperature ranges for first and second catalytic reactions in a fuel processing subsystem for a proton exchange membrane type fuel cell system wherein the reformate undergoes the first catalytic reaction before the second catalytic reaction, the method comprising the step of:
    cooling the reformate flow to the desired temperature range for the second catalytic reaction by transferring heat from the reformate flow to an initial pass of a coolant flow that has not been heated by the reformate flow and by transferring heat between the reformate flow and another pass of the coolant flow that has been preheated by the reformate flow both in the initial pass and upstream of the first catalytic reaction.

6. The method of claim 5 wherein the cooling step comprises regulating a total flow rate of the coolant flow.

7. The method of claim 5 wherein the cooling step comprises regulating a total flow rate of the coolant flow as a function of a flow rate of the reformate flow.

8. The method of claim 7 wherein the function is linear.

9. The method of claim 5 wherein heat is transferred from the reformate flow to the another pass of the coolant flow for a first flow rate of the reformate flow, and heat is transferred from the another pass of the coolant flow to the reformate flow for a second flow rate of the reformate flow, the second flow rate being less than the first flow rate.

10. A method of cooling a reformate flow to desired temperature ranges for first and second catalytic reactions in a fuel processing subsystem for a proton exchange membrane type fuel cell system wherein the reformate undergoes the first catalytic reaction before the second catalytic reaction, the method comprising the step of:

cooling the reformate flow to the desired temperature range for the first catalytic reaction with a coolant flow that has been heated both by the reformate flow downstream of the first catalytic reaction and the reformate flow upstream of the first catalytic reaction, wherein the cooling step comprises regulating a total flow rate of the coolant flow.

11. The method of claim 10 wherein the cooling step comprises regulating a total flow rate of the coolant flow as a function of a flow rate of the reformate flow.

12. The method of claim 11 wherein the function is a linear function.

13. A method of cooling a reformate flow to desired temperature ranges for first and second catalytic reactions in a fuel processing subsystem for a proton exchange membrane type fuel cell system wherein the reformate undergoes the first catalytic reaction before the second catalytic reaction, the method comprising the steps of:

cooling the reformate flow to the desired temperature range for the first catalytic reaction with a coolant flow that has been heated both by the reformate flow downstream of the first catalytic reaction and the reformate flow upstream of the catalytic reaction; and cooling the reformate flow to the desired temperature range for the second catalytic reaction with an initial pass of a coolant flow that has not been heated by the reformate flow and with another pass of the coolant flow that has been heated upstream of the first catalytic reaction by the reformate flow.

14. The method of claim 13 wherein the cooling step comprises regulating a total flow rate of the coolant flow.

15. The method of claim 13 wherein the cooling step comprises regulating a total flow rate of the coolant flow as a function of a flow rate of the reformate flow.

16. The method of claim 15 wherein the function is a linear function.

17. The method of claim 13 wherein heat is transferred from the reformate flow to the another pass of the coolant flow for a first flow rate of the reformate flow, and heat is transferred from the another pass of the coolant flow to the reformate flow during a second flow rate of the reformate flow, the second flow rate being less than the first flow rate.

* * * * *